United States Patent
Tan Bergström et al.

(10) Patent No.: US 9,801,090 B2
(45) Date of Patent: Oct. 24, 2017

(54) MEASUREMENT REPORTS

(71) Applicant: Telefonaktiebolaget LM Ericsson (publ), Stockholm (SE)

(72) Inventors: Mattias Tan Bergström, Stockholm (SE); Johan Söder, Stockholm (SE); Henning Wiemann, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/100,523

(22) PCT Filed: Apr. 5, 2016

(86) PCT No.: PCT/SE2016/050286
§ 371 (c)(1),
(2) Date: May 31, 2016

(87) PCT Pub. No.: WO2016/163936
PCT Pub. Date: Oct. 13, 2016

(65) Prior Publication Data
US 2017/0127306 A1    May 4, 2017

Related U.S. Application Data

(60) Provisional application No. 62/145,629, filed on Apr. 10, 2015.

(51) Int. Cl.
*H04W 24/10*    (2009.01)
*H04B 17/309*   (2015.01)
(Continued)

(52) U.S. Cl.
CPC .......... *H04W 24/10* (2013.01); *H04B 17/309* (2015.01); *H04W 84/042* (2013.01);
(Continued)

(58) Field of Classification Search
USPC ... 455/522, 69–70, 67.11, 67.13, 63.1, 550.1
See application file for complete search history.

(56) References Cited

U.S. PATENT DOCUMENTS

| 2012/0302227 A1* | 11/2012 | Kreuzer | H04W 24/10 |
| | | | 455/422.1 |
| 2013/0084850 A1* | 4/2013 | Martin | H04W 24/10 |
| | | | 455/423 |

(Continued)

FOREIGN PATENT DOCUMENTS

| WO | 2008053314 A2 | 5/2008 |
| WO | 2012065652 A1 | 5/2012 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.5.0, Mar. 2015, 1-445.

(Continued)

*Primary Examiner* — Fayyaz Alam
(74) *Attorney, Agent, or Firm* — Murphy, Bilak & Homiller, PLLC

(57) ABSTRACT

According to an aspect, there is provided a method of operating a terminal device in a first communication network, wherein the first communication network is operated by a first network operator, the method comprising receiving (201) one or more signals; determining (203), for each of the one or more received signals, whether the signal was received from a network node that is considered by the first network operator to be a priority node or from a network node that is considered by the first network operator to be a non-priority node; forming (205) a measurement report comprising measurements of one or more of the received signals, the measurement report being formed by prioritizing the inclusion of measurements of signals received from (Continued)

priority nodes over measurements of signals received from non-priority nodes; and sending (207) the measurement report to a network node in the first communication network.

37 Claims, 9 Drawing Sheets

(51) Int. Cl.
  *H04W 88/08* (2009.01)
  *H04W 88/02* (2009.01)
  *H04W 84/12* (2009.01)
  *H04W 84/04* (2009.01)

(52) U.S. Cl.
  CPC ............ *H04W 84/12* (2013.01); *H04W 88/02* (2013.01); *H04W 88/08* (2013.01)

(56) References Cited

U.S. PATENT DOCUMENTS

| | | | | |
|---|---|---|---|---|
| 2014/0349644 | A1* | 11/2014 | Gomes .............. | H04W 36/0083 455/434 |
| 2016/0269924 | A1* | 9/2016 | Fong ........................ | H04W 8/20 |
| 2016/0337960 | A1* | 11/2016 | Nagasaka .............. | H04W 48/18 |

OTHER PUBLICATIONS

3GPP, "3rd Generation Partnership Project; Technical Specification Group Radio Access Network; Radio Resource Control (RRC); Protocol specification (Release 12)", 3GPP TS 25.331 V12.5.0, Mar. 2015, 1-2225.

3GPP, "3rd Generation Partnership Project; Technical Specification Group Radio Access Network; Study on Wireless Local Area Network (WLAN)—3GPP radio interworking (Release 12)", 3GPP TR 37.834 V12.0.0, Dec. 2013, 1-17.

Unknown, Author, "Part 11: Wireless LAN Medium Access Control (MAC) and Physical Layer (PHY) Specifications", IEEE Std 802.11™-2012, IEEE Standard for Information technology—Telecommunications and information exchange between systems Local and metropolitan area networks—Specific requirements, New York, NY, USA, Mar. 29, 2012, 1-102.

Unknown, Author, "WLAN measurement reporting", 3GPP TSG-RAN WG2 #89bis Tdoc R2-15xxxx Bratislava, Slovakia, Ericsson, Apr. 20-24, 2015, 1-5.

3GPP, "3rd Generation Partnership Project; Technical Specification Group GSM/EDGE Radio Access Network; Radio subsystem link control (Release 12)", 3GPP TS 45.008 V12.4.0 (Nov. 2014), Nov. 2014, 1-153.

* cited by examiner

MEASUREMENT REPORTS

TECHNICAL FIELD

The disclosure relates to a terminal device in a communication network that performs measurements on one or more signals received by the terminal device and that forms a measurement report that is to be sent to a network node in the communication network.

BACKGROUND

The wireless local-area network (WLAN) technology known as "Wi-Fi" has been standardized by IEEE in the 802.11 series of specifications (i.e., as "IEEE Standard for Information technology—Telecommunications and information exchange between systems. Local and metropolitan area networks—Specific requirements. Part 11: Wireless LAN Medium Access Control (MAC) and Physical Layer (PHY) Specifications").

The IEEE 802.11 specifications regulate the functions and operations of the Wi-Fi access points (APs) or wireless terminals, collectively known as "stations" or "STA," in the IEEE 802.11, including the physical layer protocols, Medium Access Control (MAC) layer protocols, and other aspects needed to secure compatibility and inter-operability between access points and portable terminals. Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies (RATs). Network operators that are currently serving mobile users with, for example, any of the technologies standardized by the 3rd-Generation Partnership Project (3GPP), including the radio-access technologies known as Long-Term Evolution (LTE), Universal Mobile Telecommunications System (UMTS)/Wideband Code-Division Multiple Access (WCDMA), and Global System for Mobile Communications (GSM), see Wi-Fi as a wireless technology that can provide good additional support for users in their regular cellular networks.

There is currently quite intense activity in the area of operator-controlled Wi-Fi in several standardisation organisations. In 3GPP, activities to connect Wi-Fi access points (APs) to the 3GPP-specified core network are being pursued, and in the Wi-Fi Alliance (WFA), activities related to certification of Wi-Fi products are being undertaken, which to some extent also is driven from the need to make Wi-Fi a viable wireless technology for cellular operators to support high bandwidth offerings in their networks. The term Wi-Fi offload is commonly used and points towards that cellular network operators seek means to offload traffic from their cellular networks to Wi-Fi, e.g. in peak-traffic-hours and in situations when the cellular network for one reason or another needs to be off-loaded, e.g. to provide requested quality of service, maximise bandwidth or simply for coverage.

For a network operator, offering a mix of two technologies that are standardised in isolation from each other provides a challenge of providing intelligent mechanisms for co-existence. One such area is connection management.

Portable wireless devices or terminal devices (also referred to in 3GPP as UEs) today usually support both Wi-Fi and a number of 3GPP cellular technologies, but many of the terminal devices are effectively behaving as two separate devices, from a radio access perspective. The 3GPP radio access network (RAN) and the modems and protocols that are operating pursuant to the 3GPP specifications are basically unaware of the wireless access Wi-Fi protocols and modems that are operating pursuant to the 802.11 specifications.

One solution for performing traffic steering between a WLAN and a 3GPP network is presented below. This option allows a first RAT, e.g. a 3GPP RAT, to control the connection of a terminal device to a second RAT, e.g. a WLAN, by sending traffic steering commands ordering the terminal device to steer traffic from/to the second RAT. The following is based on section 6.1.3 of 3GPP TR 37.834 v12.0.0 (2013-12) and corresponds to 'Solution 3' in that document.

In this solution the traffic steering for UEs in RRC CONNECTED/CELL_DCH state is controlled by the network using dedicated traffic steering commands, potentially based also on WLAN measurements (reported by the UE).

For UEs in IDLE mode and CELL_FACH, CELL_PCH and URA_PCH states the solution is similar to the solutions described in sections 6.1.1 and 6.1.2 of 3GPP TR 37.834 v12.0.0 (2013-12). Alternatively, UEs in those RRC (radio resource control) states can be configured to connect to RAN and wait for dedicated traffic steering commands.

User preference always takes precedence over RAN based or Access network discovery and selection function (ANDSF) based rules (e.g. when a non-operator WLAN is preferred or WLAN is off).

In this solution:
if ANDSF is not present, the UE moves the traffic indicated in the steering command to WLAN or 3GPP as indicated;
when multiple Access Networks are possible according to the ANDSF policy, the traffic steering commands can override order of access network priorities, e.g. if for certain IP flows ANDSF indicates a prioritized order of 3GPP access and WLAN, upon reception of a command to steer traffic from 3GPP access to WLAN, the UE moves the corresponding flows to WLAN;
The dedicated traffic steering command cannot override ANDSF in other cases i.e. the UE shall not consider an access network that is forbidden by ANDSF as being available based on the steering command. The UE should not consider an access network that is restricted by ANDSF as being available based on the steering command.

The above rules apply whether the H-ANDSF (Home-ANDSF) or the V-ANDSF (Visiting-ANDSF) policy are active.

As an example, traffic steering for UEs in RRC CONNECTED/CELL_DCH comprises the steps shown in FIG. 1.

Step 1. Measurement control: The eNB/RNC (radio network controller) configures the UE measurement procedures including the identity of the target WLAN to be measured.
Step 2. Measurement report: The UE is triggered to send MEASUREMENT REPORT by the rules set by the measurement control.
Step 3. Traffic steering: The eNB/RNC sends the steering command message to the UE to perform the traffic steering based on the reported measurements and loading in the RAN.

It will be noted that the above procedures do not take into account user preference and/or the WLAN radio state. For example, based on user preferences and/or WLAN radio state, a UE may not be able to perform the configured measurement events. Additionally, the procedures need to allow a UE to be able to prioritize non-operator WLAN over operator WLAN. For example, the UE may disassociate from the operator WLAN and associate with the higher priority non-operator WLAN at any time during the measurement process.

The procedure illustrated above, and the following description can apply to UMTS CELL_FACH as well. The procedure can also be extended to UMTS/LTE Idle modes and UMTS CELL/URA_PCH states, e.g. UEs may be configured to report some indication (e.g. on available WLAN measurements) in a RRC UL (uplink) message, e.g., RRC connection request (from Idle, in UMTS/LTE) or CELL UPDATE (in UMTS CELL/URA_PCH states).

It should be noted that some of the steps above, e.g. steps 1&2, can be optional, based on the RAN/UE configuration.

Step 1: Measurement Control

For measurement control, the following examples are types of information that the UE can be configured to measure on the operator WLAN:
1. Measurement events to trigger reporting as defined in Table 1 below
2. Target identification as defined in Table 2 below
3. Measurements to report as defined in Table 3 below Based on the measurement events defined in TS 36.331 and TS 25.331, Table 1 shows the candidate measurement events for WLAN:

TABLE 1

| Event | Description |
| --- | --- |
| W1 | WLAN becomes better than a threshold (to trigger traffic steering to WLAN) |
| W2 | WLAN becomes worse than a threshold (to trigger traffic steering from WLAN) |
| W3 | 3GPP Cell's radio quality becomes worse than threshold1 and WLAN's radio quality becomes better than threshold2 (to trigger traffic steering to WLAN) |
| W4 | WLAN's radio quality becomes worse than threshold1 and 3GPP Cell's radio quality becomes better than threshold2 (to trigger traffic steering from WLAN) |

It should be noted that the thresholds are based on the values of the measurements to report defined in Table 3.

The target identification is used to indicate to the UE which WLAN to consider for the measurement control procedures including the target WLAN ID and the operating channels to search for. Table 2 shows the candidate target identifiers for WLAN.

It should be noted that for steering traffic from WLAN, i.e., W2/W4, it may be sufficient that just the serving WLAN below a threshold is reported, i.e. the WLAN target identifiers are not needed.

TABLE 2

| Identifier | Description | Availability in WLAN |
| --- | --- | --- |
| BSSID | Basic Service Set Identifier: For infrastructure BSS, the BSSID is the MAC address of the wireless access point | Beacon or Probe Response |
| SSID | Service Set Identifier: The SSID can be used in multiple, possibly overlapping, BSSs | Beacon or Probe Response |
| HESSID | Homogeneous Extended Service Set Identifier: A MAC address whose value shall be configured by the Hotspot Operator with the same value as the BSSID of one of the APs in the network. All APs in the wireless network shall be configured with the same HESSID value. | Beacon or Probe Response (802.11) |

TABLE 2-continued

| Identifier | Description | Availability in WLAN |
| --- | --- | --- |
| Domain Name List | Domain Name List element provides a list of one or more domain names of the entity operating the WLAN access network. | ANQP (HS 2.0) |
| Operating class, channel number | Indication of the target WLAN frequency. See Annex E of 802.11 [5] for definitions of the different operating classes | N/A |

NOTE:
If above information is not available in eNB/RNC, it is possible for RAN to configure general WLAN measurements Step 2: Measurement Report Table 3 shows the candidate measurements to report for WLAN.

TABLE 3

| Identifier | Description | Availability in WLAN |
| --- | --- | --- |
| RCPI | Received Channel Power Indicator: Measure of the received RF power in the selected channel for a received frame in the range of −110 to 0 dBm | Measurement |
| RSNI | Received Signal to Noise Indicator: An indication of the signal to noise plus interference ratio of a received IEEE 802.11 frame. Defined by the ratio of the received signal power (RCPI-ANPI) to the noise plus interference power (ANPI) in steps of 0.5 dB in the range from −10 dB to +117 dB | Measurement |
| BSS Load | Contains information on the current STA population and traffic levels in the BSS. | Beacon or Probe Response (802.11k) |
| WAN metrics | Includes estimates of DL and UL speeds and loading as well as link status and whether the WLAN AP is at capacity. | ANQP (HS 2.0) |

Step 3: Traffic Steering

In order for RAN to control traffic routing (if agreed to be supported) if ANDSF is not used, the RAN would need to know which Access Point Names (APNs)/bearers may be (not) offloaded. The RAN also needs means to inform the UEs accordingly so that e.g. the UE can issue the corresponding binding update with the CN (core network) over S2c. This would impact signalling between CN and eNB as well as the UE behaviour between AS (Access stratum) and NAS (Non-access stratum) level.

Table 4 shows candidate examples for identifying the traffic to steer to or from WLAN.

TABLE 4

| Identifier | Description |
| --- | --- |
| DRB/RB-ID | Identity of a radio bearer |
| QCI | QoS Class Identifier |

In LTE, an RRM (radio resource management) measurement framework exists according to which an eNB can configure the UE to report to the network when the UE finds an LTE cell which has e.g. a signal strength above a configured threshold. The UE would, when configured with such a configuration, scan for LTE cells and if the UE finds an LTE cell with a signal strength above the configured threshold, a measurement report would be triggered.

The UE includes in this report measurements also for other cells, even those cells which do not have a signal strength above the threshold.

The eNB uses these measurements to perform mobility procedures for the UE, e.g. to add additional cells for the UE to boost the UE's throughput.

To further improve the performance of LTE systems, 3GPP has started a study on how to enable the use of LTE in unlicensed spectrum, which is referred to as Licensed Assisted Access (LAA). As unlicensed spectrum can never match the qualities of licensed spectrum, the intention with LAA is to apply carrier aggregation and use a secondary carrier in an unlicensed band, while having a primary carrier in a licensed band. A carrier used in unlicensed bands will herein be referred to as an LAA-carrier/LAA-cell/etc.

When LTE is operating in unlicensed spectrum there may be multiple operators which have LAA cells in the same band. This is different from normal LTE operation where the operator has dedicated spectrum and other operators are not allowed to deploy cells on the same frequency.

SUMMARY

According to the measurement reporting mechanism defined for LTE (e.g. the A4 measurement event) the UE is configured to send a measurement report to the network when the UE has identified at least one cell with a signal strength (or signal quality if that is what is measured) above a certain threshold. The terminal device will include in the measurement report the eight best cells (not including the primary cell (PCell)) where best is in terms of signal strength or signal quality (depending on which metric the UE is configured to measure).

While this works well for the purpose of LTE in licensed spectrum, it may not be suitable for measurements of other RATs, e.g. for WLAN measurements as part of a traffic steering procedure, or for measurements on LTE in unlicensed spectrum. One reason for this is that unlicensed spectrum can be used by anyone and hence the UE will find cells/nodes belonging not only to the operator that the UE itself belongs to, but can find cells/nodes belonging to other operators too. So in unlicensed spectrum none of the eight best cells/nodes may belong to the operator itself, instead it may be so that the ninth best cell belongs to the operator. Therefore, with prior art reporting mechanisms the UE may report only measurements for cells/nodes not belonging to the operator. While these measurements may be useful, it is more important for the network to receive measurements of its own cells/nodes.

There is therefore a need for improvements to measurement reporting so that it provides suitable measurements in the case of, for example, measurements of other RATs, such as WLAN, and/or measurements of signals received in unlicensed spectrum.

Therefore, according to an aspect, there is provided a method of operating a terminal device in a first communication network, wherein the first communication network is operated by a first network operator. The method comprises receiving one or more signals; determining, for each of the one or more received signals, whether the signal was received from a network node that is considered by the first network operator to be a priority node or from a network node that is considered by the first network operator to be a non-priority node; forming a measurement report comprising measurements of one or more of the received signals, the measurement report being formed by prioritizing the inclusion of measurements of signals received from priority nodes over measurements of signals received from non-priority nodes; and sending the measurement report to a network node in the first communication network.

According to a second aspect, there is provided a computer program product comprising a computer readable medium having computer readable code embodied therein, the computer readable code being configured such that, on execution by a suitable computer or processor, the computer or processor is caused to perform the method described above.

According to a third aspect, there is provided a terminal device for use in a first communication network, wherein the first communication network is operated by a first network operator. The terminal device is adapted to receive one or more signals; determine, for each of the one or more received signals, whether the signal was received from a network node that is considered by the first network operator to be a priority node or from a network node that is considered by the first network operator to be a non-priority node: form a measurement report comprising measurements of one or more of the received signals, the measurement report being formed by prioritizing the inclusion of measurements of signals received from priority nodes over measurements of signals received from non-priority nodes; and send the measurement report to a network node in the first communication network.

According to a fourth aspect, there is provided a method of operating a network node for use in a first communication network, wherein the first communication network is operated by a first network operator. The method comprises receiving a measurement report from a terminal device in the first communication network, the measurement report comprising measurements of one or more signals received by the terminal device, wherein the terminal device formed the measurement report by prioritizing the inclusion of measurements of signals received from network nodes considered by the first network operator to be priority nodes over measurements of signals received from network nodes considered by the first network operator to be non-priority nodes.

According to a fifth aspect, there is provided a network node for use in a first communication network, wherein the first communication network is operated by a first network operator. The network node is adapted to receive a measurement report from a terminal device in the first communication network, the measurement report comprising measurements of one or more signals received by the terminal device, wherein the terminal device formed the measurement report by prioritizing the inclusion of measurements of signals received from network nodes considered by the first network operator to be priority nodes over measurements of signals received from network nodes considered by the first network operator to be non-priority nodes.

BRIEF DESCRIPTION OF THE DRAWINGS

Features, objects and advantages of the presently disclosed techniques will become apparent to those skilled in the art by reading the following detailed description where references will be made to the appended figures in which.

DETAILED DESCRIPTION

Figure 1:
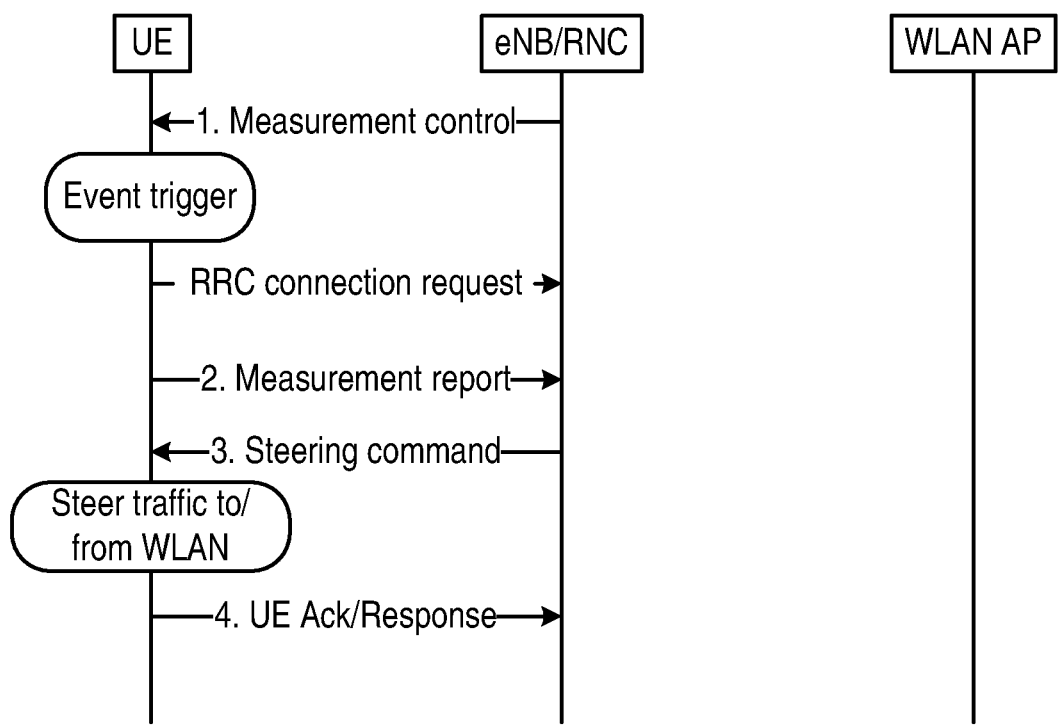
FIG. 1 shows the signalling in a solution for performing traffic steering between a WLAN and a 3GPP network.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, etc.

A cell is associated with a base station, where a base station comprises in a general sense any network node transmitting radio signals in the downlink (DL) and/or receiving radio signals in the uplink (UL). Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes, or WLAN access point (AP). A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

It should be noted that use of the term "network node" as used herein can refer to a base station, such as an eNodeB, a WLAN AP, a network node in the RAN responsible for resource management, such as a radio network controller (RNC), or, in some cases, a core network node, such as a mobility management entity (MME).

Unless otherwise indicated herein, the signalling described is either via direct links or logical links (e.g. via higher layer protocols and/or via one or more network nodes).

Figure 2:
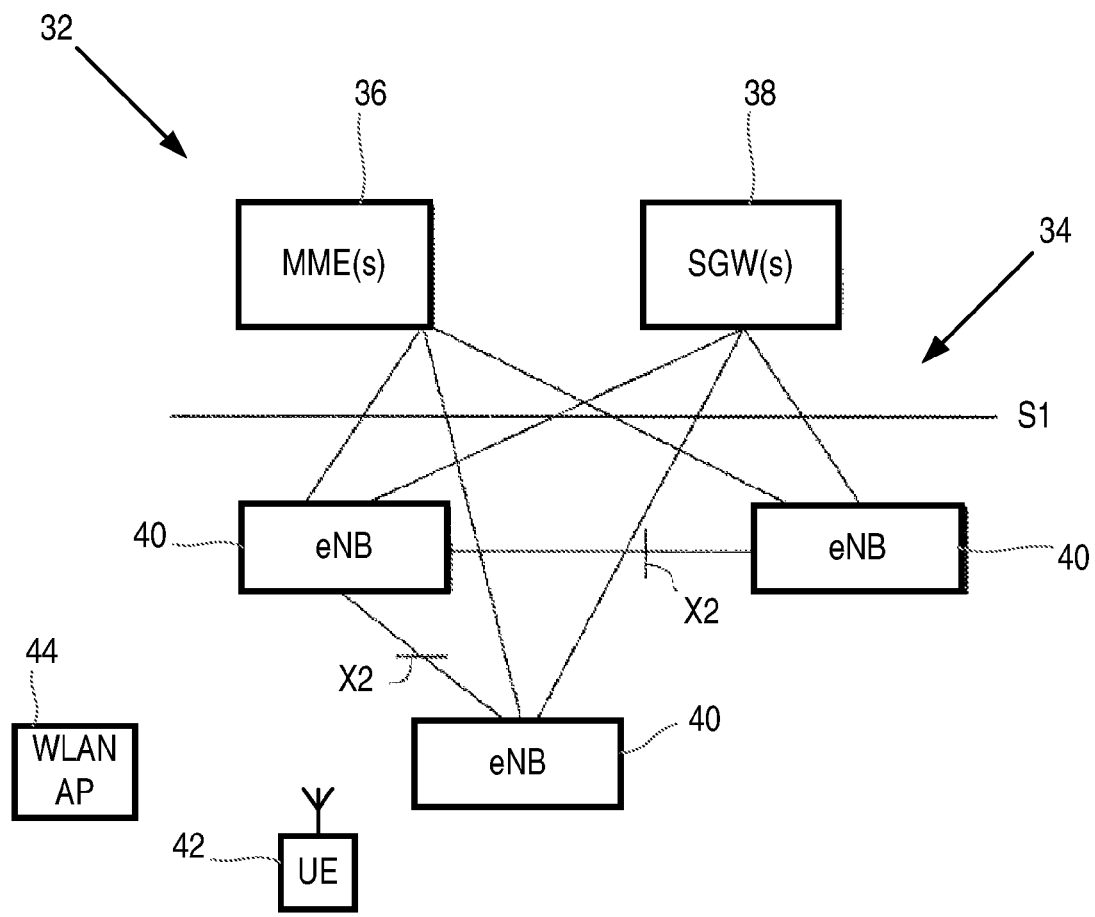
FIG. 2 is a block diagram illustrating an LTE network and WLAN.

FIG. 2 shows an example diagram of an E-UTRAN architecture as part of an LTE-based communications system 32 to which the techniques described herein can be applied. Nodes in the core network 34 include one or more Mobility Management Entities (MMEs) 36, a key control node for the LTE access network, and one or more Serving Gateways (SGWs) 38 which route and forward user data packets while acting as a mobility anchor. They communicate with base stations 40 referred to in LTE as eNBs, over an interface, for example an S1 interface. The eNBs 40 can include the same or different categories of eNBs, e.g. macro eNBs, and/or micro/pico/femto eNBs. The eNBs 40 communicate with each other over an interface, for example an X2 interface. The S1 interface and X2 interface are defined in the LTE standard. A UE 42 is shown, and a UE 42 can receive downlink data from and send uplink data to one of the base stations 40 with that base station 40 being referred to as the serving base station of the UE 42. Although not part of the E-UTRAN architecture, a WLAN access point (AP) 44 is also shown in FIG. 2. The UE 42 can receive downlink data from and send uplink data to the AP 44.

Figure 3:
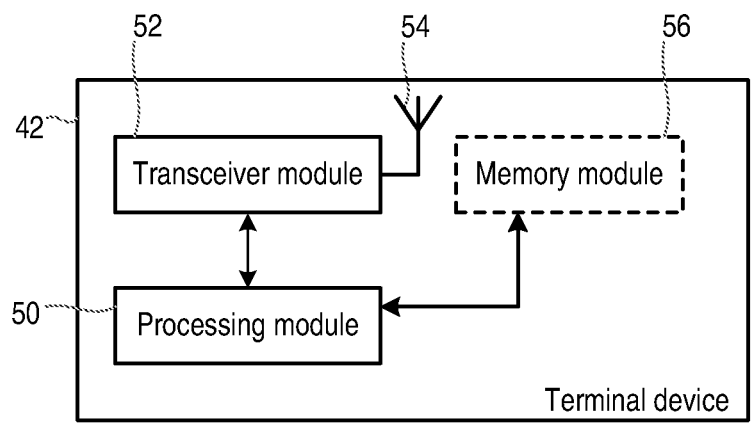
FIG. 3 is a block diagram of a terminal device according to an embodiment.

FIG. 3 shows a terminal device (UE) 42 that can be adapted or configured to operate according to one or more of the non-limiting example embodiments described. The UE 42 comprises a processor or processing module 50 that controls the operation of the UE 42. The processing module 50 is connected to a transceiver module 52 (which comprises a receiver and a transmitter) with associated antenna(s) 54 which are used to transmit signals to and receive signals from a base station 40 in the network 32 and to transmit signals to and receive signals from a WLAN AP 44.

The UE 42 also comprises a memory or memory module 56 that is connected to the processing module 50 and that contains instructions or computer code executable by the processor 50 and other information or data required for the operation of the UE 42. Thus, in at least one embodiment, the processing module 50 comprises a microprocessor or other computer circuitry that is programmed at least in part based on its execution of computer program instructions stored in a computer-readable medium. More generally, the processing module 50 comprises fixed processing circuitry, programmed processing circuitry, or any combination thereof, that is configured to carry out the processing operations disclosed in the various embodiments presented herein.

Figure 4:
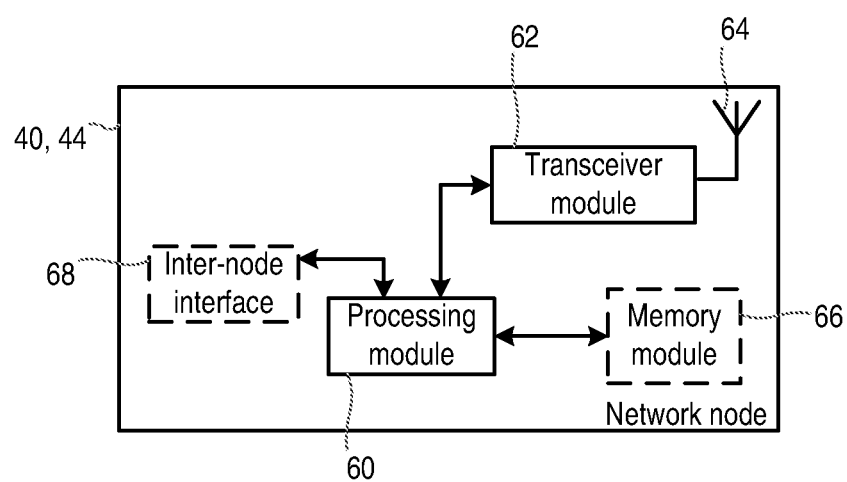
FIG. 4 is a block diagram of a network node according to an embodiment.

FIG. 4 shows a network node (for example a base station such as a NodeB or an eNodeB, or a WLAN AP) that can be adapted or configured to operate according to the example embodiments described. The network node 40 comprises a processor or processing module 60 that controls the operation of the network node 40. The processing module 60 is connected to a transceiver module 62 (which comprises a receiver and a transmitter) with associated antenna(s) 64 which are used to transmit signals to, and receive signals from, UEs 42 in the network 32. The network node 40 also comprises a memory or memory module 66 that is connected to the processing module 60 and that contains instructions or computer code executable by the processor 60 and other information or data required for the operation of the network node 50.

In at least one embodiment, the processing module 60 comprises a microprocessor or other computer circuitry that is programmed at least in part based on its execution of computer program instructions stored in a computer-readable medium. More generally, the processing module 60 comprises fixed processing circuitry, programmed processing circuitry, or any combination thereof, that is configured to carry out the processing operations disclosed in the various embodiments presented herein.

The network node 40 also includes components and/or circuitry 68 for allowing the network node 40 to exchange information with another network node 40 (for example via an X2 and/or S1 interface). It will be appreciated that base stations for use in other types of network (e.g. UTRAN or Wideband Code Division Multiple Access (WCDMA) radio access network (RAN)) will include similar components to those shown in FIG. 4 and appropriate interface circuitry 68 for enabling communications with the other network nodes in those types of networks (e.g. other base stations, mobility management nodes and/or nodes in the core network).

It will be appreciated that only the components of the UE 42 and network node 40 required to explain the embodiments presented herein are illustrated in FIGS. 3 and 4.

As noted above, improvements in the reporting of measurements of, for example, signals received from RATs other than the RAT the UE is currently using, and/or of signals received in unlicensed spectrum, are desired so that the network operator can receive a suitable set of measurements from UEs. The measurements of the signals can be values for one or more quality metrics that can be determined by the UE from the received signals. Examples of quality metrics that can be measured are provided below.

Although the following description mainly relates to techniques for forming a measurement report of measurements of signals received from WLAN APs (that can be part of the same or different WLANs), it will be appreciated that the techniques are more generally applicable to forming measurement reports of measurements of any signals received by a terminal device/UE from other networks and/or networks operating according to other types of RAT, and in particular signals from LAA cells.

In the following, a 'priority' node is a network node (e.g. eNB 40. AP 44 or other type of RAN node) or cell which the UE has been configured to prioritize for inclusion in a measurement report. As such, the priority node may be one or more WLAN(s)/WLAN AP(s) that are owned by the network operator of the communication network that the UE is operating in (e.g. the priority node may be an operator WLAN, or WLAN with which the network operator has an agreement or association, or a LAA cell belonging to the network operator), or one or more WLAN(s)/WLAN AP(s) that the network operator of the communication network that the UE is operating in has signalled to the UE as priority nodes (these are also referred to as 'network-indicated WLAN(s)/WLAN AP(s)'). The term 'priority WLAN' is used herein to refer to a priority node (e.g. AP) in a WLAN, and the term 'non-priority WLAN' is used to refer to a non-priority node (e.g. AP) in a WLAN). A 'non-priority' node is a node or cell which is not a priority node, and can be one or more WLAN(s)/WLAN AP(s) that are not owned by the network operator or otherwise associated with the network operator (e.g. a non-priority node can be a non-operator WLAN or an LAA cell not belonging to the operator) or not a 'network-indicated WLAN/WLAN AP'.

In a particular embodiment a UE that is operating in a first communication network (e.g. being served by a base station in the first communication network), such as an LTE network 32, can scan for WLANs (e.g. scan for signals from WLAN APs 44) and for the detected WLANs the UE would identify/classify them as a 'priority' WLAN or a 'non-priority' WLAN. Based on whether a WLAN is considered to be a priority WLAN or a non-priority WLAN, the UE would handle the measurements for the WLANs differently when forming a measurement report that is to be sent to a network node in the first communication network. For example, when the UE creates a measurement report containing the measurements of the WLAN, the UE prioritizes the inclusion of measurements of priority WLANs over non-priority WLANs.

Where the above technique is applied to signals received from LAA cells, it will be appreciated that the classification of the nodes as priority nodes/non-priority nodes may mean that the UE handles measurements for the operator's own (the operator which the UE is registered with) cells differently to other cells in the same band.

In some cases, the UE could handle the measurements of priority and non-priority WLANs differently by only triggering the forming and sending of a measurement report if a measurement reporting triggering condition has been met for a priority WLAN (but not if the triggering condition is only met for a non-priority WLAN).

In some embodiments, the UE determines/classifies whether a received signal is from a priority WLAN or a non-priority WLAN by comparing a WLAN identifier of the network node from which the signal is received to WLAN identifiers signalled to the UE by a network node in the first communication network. A WLAN node can be a priority WLAN if it has an identifier that matches an identifier signalled from a network node in the first communication network. A WLAN identifier can comprise any one or more of an SSID (service set identifier), a basic SSID (BSSID: an identifier for a specific WLAN access point (AP)), an extended SSID (ESSID), a homogenous SSID (HESSID; identifiers for a group of WLANs) or some other identifier that can address WLANs.

Figure 5:
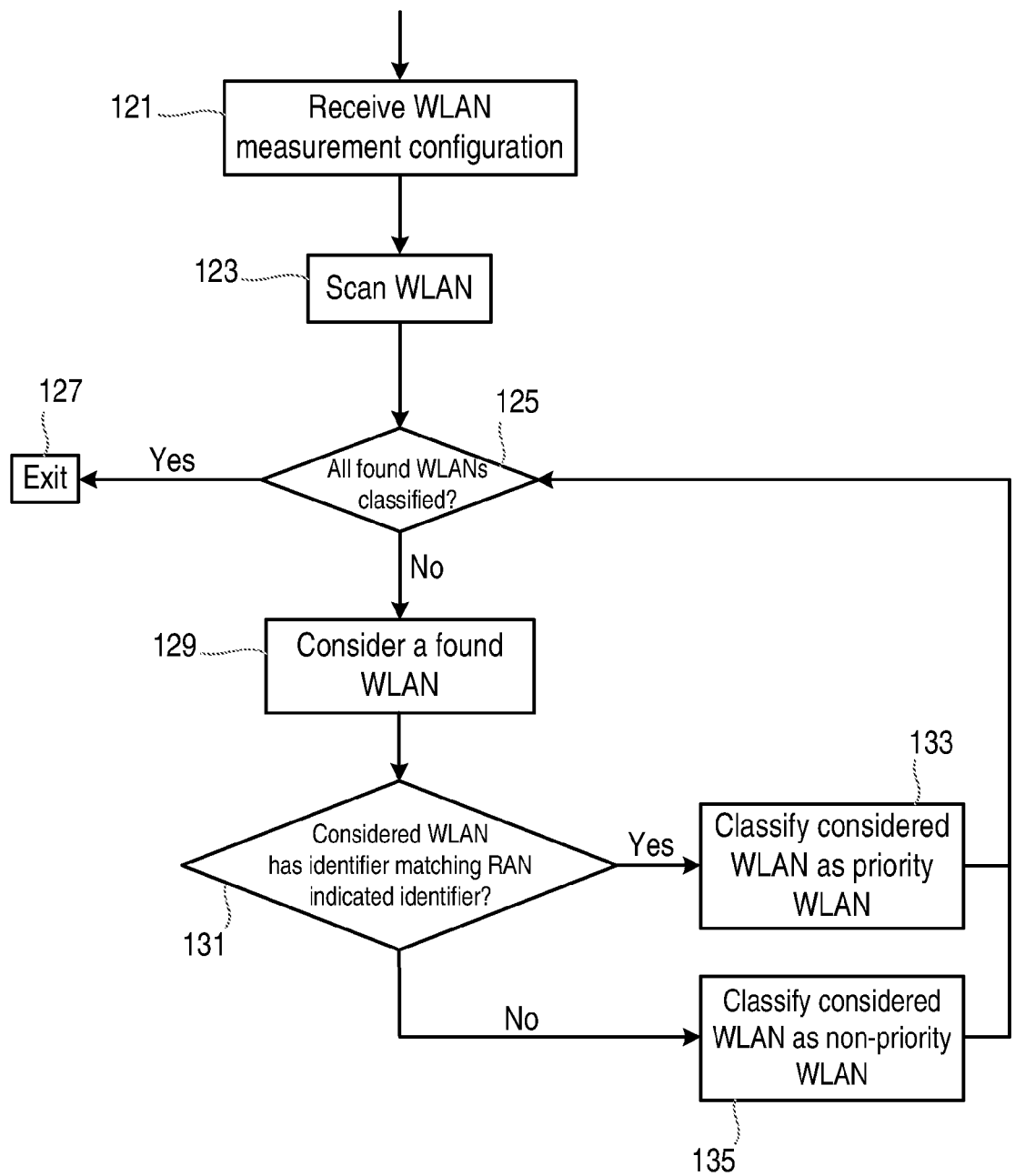
FIG. 5 is a flow chart illustrating a method of operating a terminal device according to a first specific embodiment.

The flow chart in FIG. 5 illustrates a method of operating a UE to classify WLANs from which signals have been received as priority WLANs and non-priority WLANs. In a first step, step 121, the UE receives a WLAN measurement configuration that indicates the measurements (e.g. quality metrics) that are to be made on signals received from WLAN APs. In some embodiments, the WLAN measurement configuration may simply indicate to the UE that it should measure WLANs (i.e. the configuration does not specify which quality metrics the UE is to measure). In this case the UE may be preconfigured with the one or more quality metrics that are to be evaluated. The WLAN measurement configuration can also include a list of WLAN identifiers of WLAN APs that are to be considered as priority nodes.

In step 123, the UE operates its transceiver module 52 to scan/receive signals from WLAN APs. Signals received from WLAN APs can typically include a WLAN identifier.

In step 125, the UE determines if all of the WLAN APs from which signals have been received have been classified as priority nodes or non-priority nodes. If all of the APs have been classified, the method ends (step 127). Initially, however, none of the APs will have been classified and the method passes to step 129 where one of the WLAN APs from which signals have been received is considered, and in particular it is considered whether the WLAN AP has an identifier that matches one of the priority node identifiers received from the first communication network (step 131).

If the WLAN AP has an identifier that matches at least one of the priority node identifiers received from the first communication network, then the WLAN AP is classified as a priority WLAN (step 133). If the WLAN AP has an identifier that does not match one (i.e. any) of the priority node identifiers received from the first communication network, then the WLAN AP is classified as a non-priority WLAN (step 135).

After step 133/135 (as appropriate), the method returns to step 125.

There are several alternatives for how the network node in the first communication network signals the identities of the priority nodes to the UE.

In some embodiments, an eNB/RNC (e.g. a serving eNB/RNC of the UE) may signal a set of WLAN identifiers to the UE. This can be signalled in a measurement object when the eNB/RNC configures the UE with a measurement configuration (step 121). Another option is to signal WLAN identifiers of priority nodes in a system information block in a broadcast channel.

In other embodiments, the network operator may have an ANDSF server which sends ANDSF policies to the UE. The network operator may configure the ANDSF server to provide WLAN identifiers for the WLANs which belong to the operator.

In other embodiments, an MME may provide a set of WLAN identifiers to the UE using NAS signalling.

In other embodiments, several different networks (such as a 3GPP network and a WLAN) may have a shared identifier, such as a PLMN (Public Land Mobile Network) identifier. This identifier can be known to the UE and the UE can determine that a WLAN is a priority WLAN if a PLMN of the WLAN is the same as the PLMN of the network the UE is connected to.

After classifying the APs from which signals have been received as priority WLANs and non-priority WLANs, the UE forms a measurement report from measurements of the signals. The UE forms the measurement report by considering the priority for the WLAN nodes and prioritizes the inclusion of measurements of signals received from priority nodes over measurements of signals received from non-priority nodes.

In some embodiments, the terminal device is configured so that it prioritizes priority WLAN nodes in the measurement report by only including measurements of signals from priority WLAN nodes in the measurement report. That is, measurements of signals from non-priority nodes are not included in the measurement report. This is beneficial in the case when the communication network is not interested in measurements of non-priority WLANs (e.g. WLANs not indicated as priority WLANs by the network).

In another embodiment, the UE prioritizes priority WLANs over non-priority WLANs by including non-priority WLANs in the measurement report only when there is space in the measurement report after the measurements for all detected priority WLANs have been included. For example if the UE is configured to include eight measurements in the report and the UE has found signals from five priority WLANs and ten non-priority WLANs, the UE would include the measurements of the five priority WLANs and three non-priority WLANs.

The particular measurements of non-priority WLANs that the UE includes in the report can depend on how good the measurements/non-priority WLANs are considered to be, and the UE can, for example, include the measurements of the three best non-priority WLANs. When determining which non-priority WLANs to include, the UE can give preference to those WLANs operating on the same channel (frequency) and/or frequency band as the one or more identified priority WLANs. If the WLAN is operating in the 2.4 GHz band then also WLANs operating on neighbouring channels can be included, since the channels are overlapping. This approach is beneficial in case the network is interested in measurements for other WLANs the UE has detected. This information may be useful for the network when determining whether to steer a UE to WLAN or not. For example, if the UE has reported that there are many non-prioritized WLANs in the area around the UE then it may be less interesting or useful to steer the UE to the WLAN as the channel may be occupied by non-priority WLANs and hence there will less opportunity for the UE to use the channel in communication with a priority WLAN. However, if the UE reports that there are no (or few) non-priority WLANs in the area it is expected that the UE can use the channel more frequently to communicate with a priority WLAN and hence the UE throughput is expected to be higher.

In some cases it may not be necessary for the network to receive a measurement for a WLAN if the WLAN is considered to be bad (e.g. as determined by a quality metric for the WLAN) even if the WLAN has been identified as a priority WLAN. Therefore in some embodiments the UE may only prioritize a particular priority WLAN over a non-priority WLAN in the measurement report if the priority WLAN is considered good enough (e.g. a quality metric is above a certain threshold).

Figure 6:
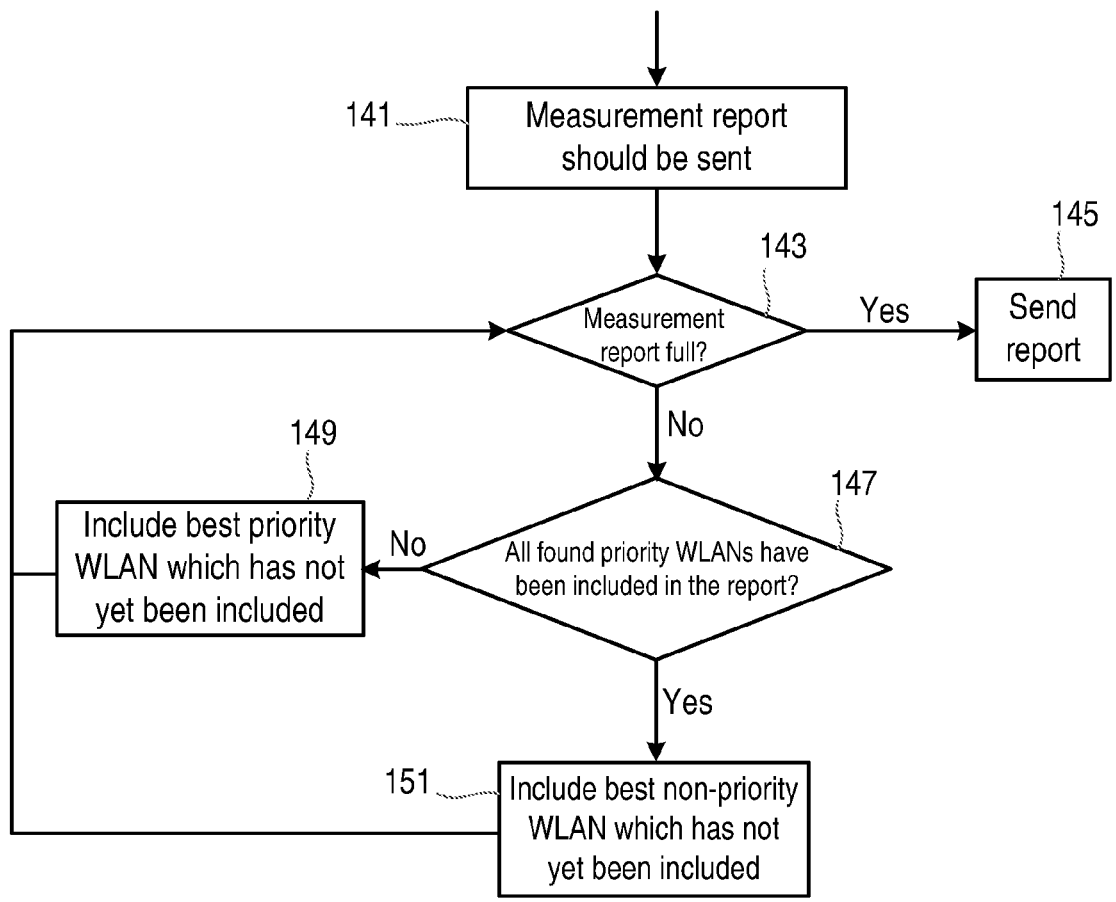
FIG. 6 is a flow chart illustrating a method of operating a terminal device according to a second specific embodiment.

The flow chart in FIG. 6 illustrates a method of forming a measurement report according to the embodiment in which the UE only includes measurements for non-priority WLANs if there is space available in the measurement report.

In a first step, the UE determines that a measurement report should be sent (step 141). The UE can determine this based on a measurement report trigger criteria being met.

Next, the UE determines if the measurement report is full (step 143). If the measurement report is full (i.e. the report includes a predetermined maximum number of measurements, e.g. eight) then the report is sent by the UE to a network node in the first communication network (step 145). However, in the first instance of step 143 (i.e. the first time step 143 is performed) the report will be empty and the method will pass to step 147. In step 147, the UE determines if all of the measurements for priority WLANs have already been included in the measurement report. If not, the method passes to step 149 in which the UE includes the measurement for the 'best' priority WLAN that has not yet been included in the report. The 'best' priority WLAN can be determined based on the measurement itself, or by a comparison of the measurements of multiple priority WLANs. The method then returns to step 143.

If at step 147 it is determined that measurements for all of the identified priority WLANs have been included in the report, the UE determines which non-priority WLAN's measurement should be included in the report (step 151). In some embodiments the UE can select the measurement for the 'best' non-priority WLAN to include in the report that has not yet been included in the report. The 'best' non-priority WLAN can be determined based on the measurement itself, by a comparison of the measurements of multiple non-priority WLANs and/or by a comparison of the measurement to measurements of the priority WLANs already included in the report. The method then returns to step 143.

In some embodiments, the UE can prioritize the inclusion of measurements of priority WLANs over measurements of non-priority WLANs by including separate lists of measurements for priority WLANs and measurements of non-priority WLANs in the measurement report. Thus, the UE sends two lists of measurements to the network node in the first communication network, a first list for priority WLANs and a second list for non-priority WLANs. This embodiment will mean that regardless of whether the best WLANs are all non-priority WLANs, the UE would always report measurements of priority WLANs as they are placed in their own list.

The size of the first and second list may be the same, e.g. both lists can contain up to five measurements. Alternatively, since the non-priority WLANs may not be considered as important as the priority WLANs, it is possible for the lists to have different sizes. The size (or sizes) of the list/measurement report may be configured by the network or may be defined in a specification.

In some embodiments, the measurements of the signals from the WLANs may be ordered in the measurement report according how good the WLANs are considered to be, with the best WLAN(s) listed first. This may result in the different groups of WLANs (priority and non-priority WLANs) being mixed together. How good the measurements/WLANs are can be based on the measurements themselves (e.g. where the measurements are a quality metric), or by comparison of the measurements from different WLANs with each other.

In the embodiments where the measurement report includes a single list of measurements, another way of ordering the WLANs in the report is to include measurements of the priority WLANs first, followed by the measurements of the non-priority WLANs. Each of these groups (priority and non-priority WLANs) in the list may be sorted or ordered individually based on how good they are, for example with the best WLAN first.

In some situations it may not be crucial for the network to get a complete measurement for the non-priority WLANs. It may be sufficient that the network obtains information about how many non-priority WLANs the UE has found. For example, if there are many non-priority WLANs in the area around the UE the network can assume that by offloading the UE to a priority WLAN the UE will need to compete with the many non-priority WLANs, and the throughput will be lower for the UE. However if there are no or few non-priority WLANs in the area, competition for the air resource will be less, and therefore higher throughput can be expected. Therefore, in some embodiments the UE can prioritize the inclusion of measurements of priority WLANs over measurements of non-priority WLANs by including measurements of signals from priority WLANs and only including an indication of the number of non-priority WLANs the UE has detected. This embodiment also has the advantage that the signalling overhead can be reduced by reducing the size of the measurement report.

In embodiments where the inclusion of measurements in the measurement report is based on how 'good' the measurements are (regardless of whether the measurements are of signals from priority WLANs or non-priority WLANs) the UE can prioritize the inclusion of measurements of priority WLANs over measurements of non-priority WLANs by applying an offset to the measurements of signals from the WLANs so that measurements of signals from priority WLANs have a higher chance of being selected for inclusion in the measurement report. For example, an offset can be applied to measurements of signals from priority WLANs to 'improve' those measurements, and the offset values (i.e. the measurement with the offset applied) can be used when the UE selects measurements to include in the report. For example, the UE may be configured to assign a 10 dB offset to measurements of signals from priority WLANs.

This will make it more likely that the measurements of the priority WLANs will be included in the measurement report.

In this example, the UE may measure the following:
WLAN A RSSI (received signal strength indication)=−75 dBm
WLAN B (a priority WLAN) RSSI=−80 dBm
WLAN C RSSI=−65 dBm With the offset applied:
WLAN A offset RSSI value=−75 dBm
WLAN B offset RSSI value=−70 dBm
WLAN C offset RSSI value=−65 dBm The UE would then use the offset values to determine which measurements to include in the measurement report. For example if the UE is configured to include the WLANs with the two highest RSSIs, the UE would include the measurements for WLAN B and WLAN C as these two WLANs have the highest offset values.

It will be appreciated that in this case the actual content of the measurement report may not be the offset values, but instead the UE could include the original measurements (i.e. the non-offset measurements). However, it will also be appreciated that the UE could include the offset measurements (offset values) in the report sent to the network, and the network will be required to remove the offset to acquire the original measurements.

In an alternative method to that described above, it will be appreciated that the offset could be applied to the measurements of signals from the non-priority WLANs so that those measurements are worsened, thereby reducing the chances of them being included in the measurement report.

In the above embodiments where the UE ranks or orders the WLANs or measurements of the signals from the WLANs based on how good or bad they are (e.g. when determining the 'best' measurement), the ranking or order can be determined based on quality metrics such as:
- signal strength—where high values of signal strength are good and low values of signal strength are bad
- signal quality—where high values of signal quality are good and low values of signal quality are bad
- air interface load—where low values of air interface load are good and high values of air interface load are bad
- backhaul data rate—where high values of backhaul rate are good and low values of backhaul rate are bad
- available backhaul rate—where high values of available rate are good and low values of available backhaul rate are bad
- estimated throughput—where high values of estimated throughput are good and low values of estimated throughput are bad
- channel availability—where high values of channel availability are good and low values of channel availability are bad
- number of co-channel WLAN neighbours within channel sensing threshold (—e.g. 82 dBm)—where a low number of neighbours is good and a high number of neighbours is bad The quality metric that the UE considers when ranking the WLANs can be the quality metric that the UE is configured to trigger the sending of the measurement report for (and/or the quality metric that the UE determines for the signals received from the WLANs and includes in the measurement report). For example if the UE is configured to report to the network when the WLAN Beacon RSSI is above a threshold, then the UE may rank the WLANs based on WLAN Beacon RSSI. However if the UE is configured to send a report when the UE finds a WLAN with a WLAN RSNI (received signal to noise indicator) above a certain threshold then the UE may rank the WLANs based on WLAN RSNI.

It is possible that the particular quality metric considered by the UE when ranking the WLANs is defined in a specification or it may be signalled to the UE by the network.

Separate to the embodiments in which WLANs are ranked, the measurements of the signals received by the UE (and thus the measurements that can be included in the measurement report) can be any one or more of the above quality metrics.

As noted above, one use case for sending measurement reports to the network is to indicate to the network when the UE can be offloaded to WLAN. Assuming that the UE can only be offloaded to WLANs belonging to the operator (or otherwise associated with the operator, such as through a sharing agreement), it may not be suitable or necessary for the UE to trigger the sending of a measurement report based only on non-priority WLANs (since these may not belong to the operator). Saying that, it should be noted that it may still be useful for the network to receive measurements for non-priority WLANs as these measurements may be useful in deciding whether to offload the UE to a priority WLAN or not, e.g. if there are many non-priority WLANs in the area which are generating a high load then offloading the UE to WLAN may impair the user experience.

As the priority WLANs may be, for example, those which belong to the operator of the home network for the UE, it may be desirable for the UE to trigger the sending of a measurement report only if a priority WLAN meets the criteria for sending a measurement report. That is, a measurement report is not triggered if only non-priority WLANs meet the criteria.

Figure 7:
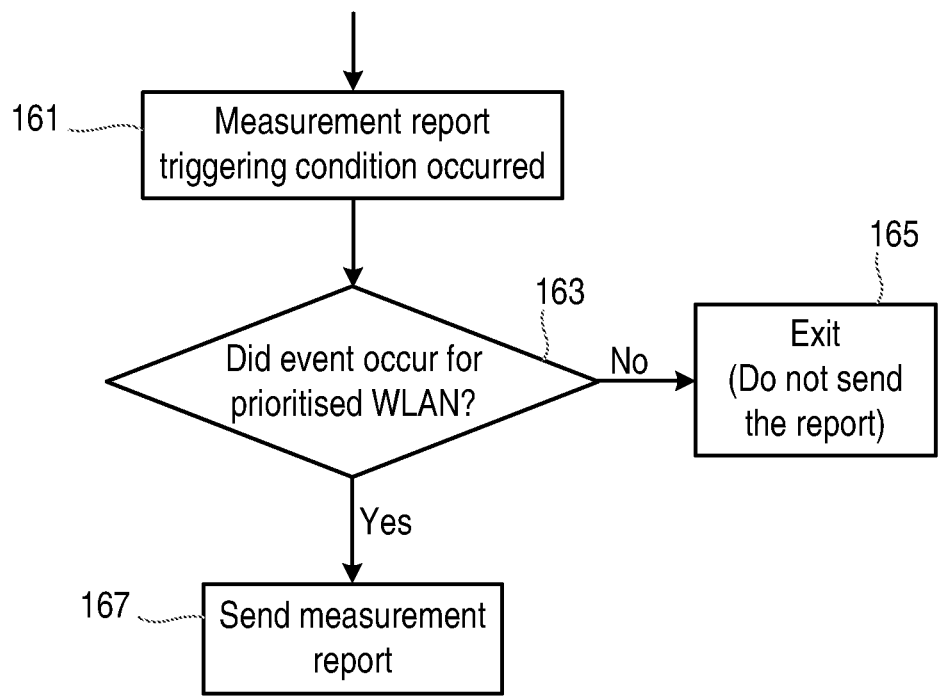
FIG. 7 is a flow chart illustrating a method of operating a terminal device according to a third specific embodiment.

A flowchart illustrating a method of operating a UE according to this embodiment is shown in FIG. 7. In step 161, the UE determines that the measurement report triggering condition has been met. In some embodiments the triggering condition can be a certain value or threshold for a measurement of a received signal. In step 163, the UE determines whether the triggering condition occurred for a priority WLAN or a non-priority WLAN. If the triggering condition occurred for a non-priority WLAN, then the method ends and the UE does not send a measurement report to the network (step 165). If the triggering condition occurred for a priority WLAN, then the UE sends a measurement report to the network (step 167).

It will be appreciated that in some embodiments the UE may not even monitor the measurement report triggering condition for non-priority WLANs, but the result achieved is the same as the method in FIG. 7.

Thus, according to the embodiments above, the UE identifies whether a WLAN is a priority WLAN or not, and based on this the UE handles the measurements of the WLAN differently in a measurement reporting procedure. In some of the above embodiments the UE ensures that priority WLANs are prioritized to be included in the measurement report, and in other ones of the above embodiments the UE will only trigger measurement reporting for a WLAN if the WLAN is a priority WLAN.

Figure 8:
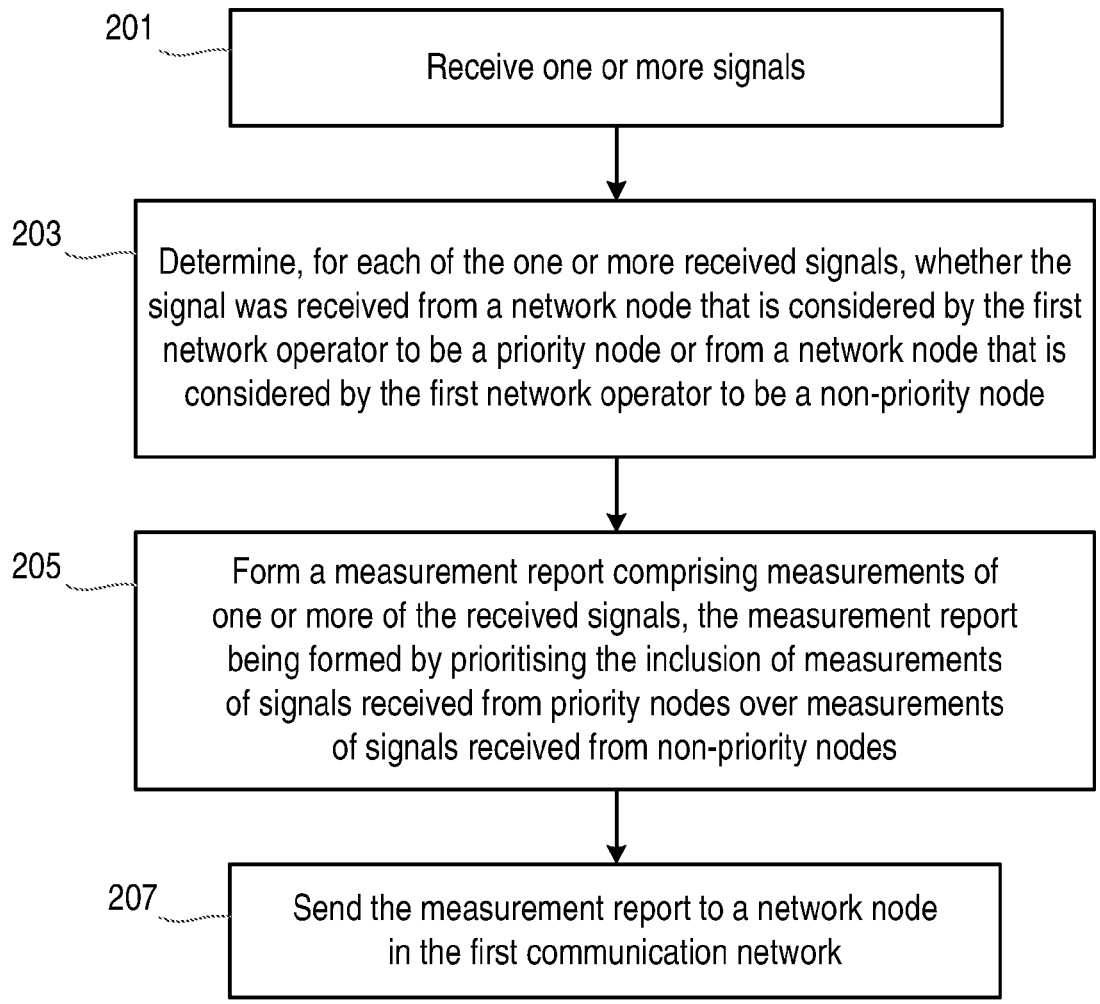
FIG. 8 is a flow chart illustrating a general method of operating a terminal device according to an embodiment.

The flow chart in FIG. 8 shows a general method of operating a terminal device according to the techniques presented herein. The terminal device is operating in a first communication network and the first communication network is operated by a first network operator. In a first step, step 201, the terminal device receives one or more signals.

Then, for each of the received signals, the terminal device determines whether the signal is received from a network node that is considered by the first network operator to be a priority node or from a network node that is considered by the first network operator to be a non-priority node (step 203).

The terminal device then forms a measurement report comprising measurements of the one or more received signals, the measurement report being formed by prioritizing the inclusion of measurements of signals received from priority nodes over measurements of signals received from non-priority nodes (step 205).

Then, the terminal device sends the measurement report to a network node in the first communication network.

Figure 9:
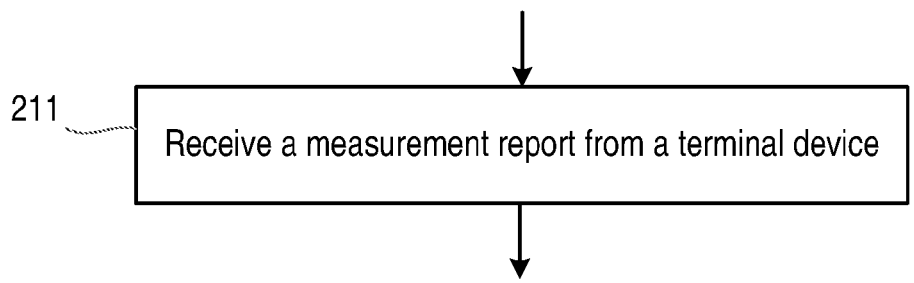
FIG. 9 is a flow chart illustrating a general method of operating a network node according to an embodiment.

The flow chart in FIG. 9 shows a general method of operating a network node according to the techniques presented herein. The network node is operating in a first communication network and the first communication network is operated by a first network operator. In step 211, the network node receives a measurement report from a terminal device in the first communication network. The measurement report comprises measurements of one or more signals received by the terminal device, and the terminal device formed the measurement report by prioritizing the inclusion of measurements of signals received from network nodes considered by the first network operator to be priority nodes over measurements of signals received from network nodes considered by the first network operator to be non-priority nodes. That is, the measurement report comprises measurements of one or more signals received by the terminal device 42, and the measurements of signals received from network nodes 44 considered by the first network operator to be priority nodes are prioritized over measurements of signals received from network nodes 44 considered by the first network operator to be non-priority nodes.

Figure 10:
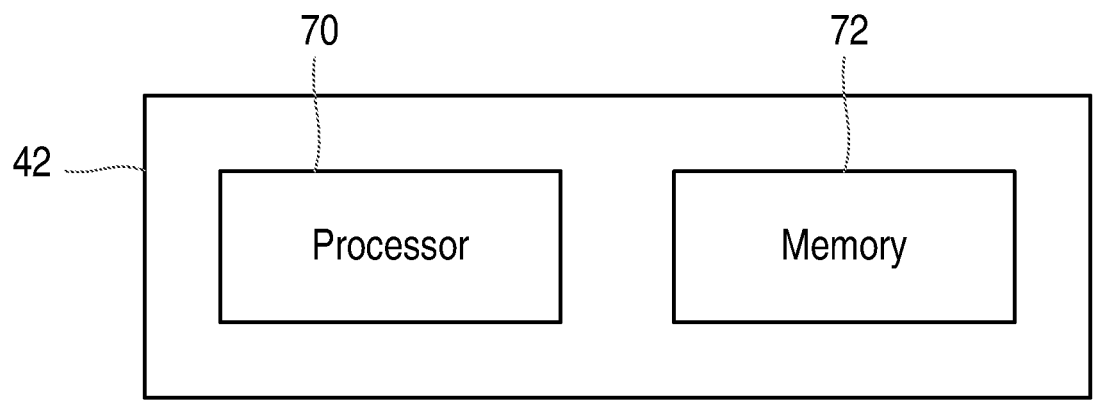
FIG. 10 is a block diagram of a terminal device according to an alternative embodiment.

FIG. 10 is a block diagram of an alternative terminal device (UE) 42 that can be used in the example embodiments described above. The terminal device 42 comprises a processor 70 and a memory 72. The memory 72 contains instructions executable by the processor 70, and on execution of those instructions, the terminal device 42 is operative to receive one or more signals; determine, for each of the one or more received signals, whether the signal was received from a network node 44 that is considered by the first network operator to be a priority node or from a network node 44 that is considered by the first network operator to be a non-priority node; form a measurement report comprising measurements of one or more of the received signals, the measurement report being formed by prioritizing the inclusion of measurements of signals received from priority nodes over measurements of signals received from non-priority nodes; and send the measurement report to a network node 40 in the first communication network.

Figure 11:
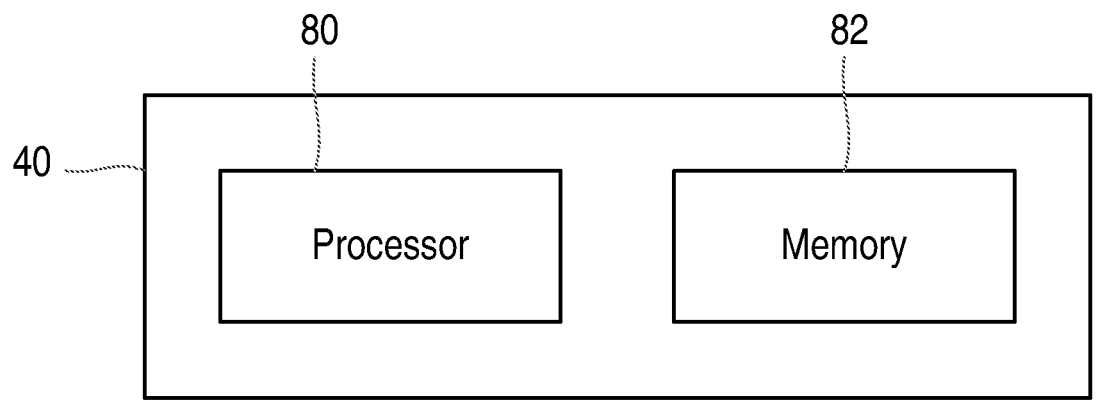
FIG. 11 is a block diagram of a network node according to an alternative embodiment.

FIG. 11 is a block diagram of an alternative network node 40 that can be used in the example embodiments described above. The network node 40 comprises a processor 80 and a memory 82. The memory 82 contains instructions executable by the processor 80, and on execution of those instructions, the network node 40 is operative to receive a measurement report from a terminal device 42 in the first communication network 32, the measurement report comprising measurements of one or more signals received by the terminal device 42. The terminal device 42 formed the measurement report by prioritizing the inclusion of measurements of signals received from network nodes 44 considered by the first network operator to be priority nodes over measurements of signals received from network nodes 44 considered by the first network operator to be non-priority nodes. That is, the network node 40 is operative to receive a measurement report from a terminal device 42 where the measurement report comprises measurements of one or more signals received by the terminal device 42, and the measurements of signals received from network nodes 44 considered by the first network operator to be priority nodes are prioritized over measurements of signals received from network nodes 44 considered by the first network operator to be non-priority nodes.

Figure 12:
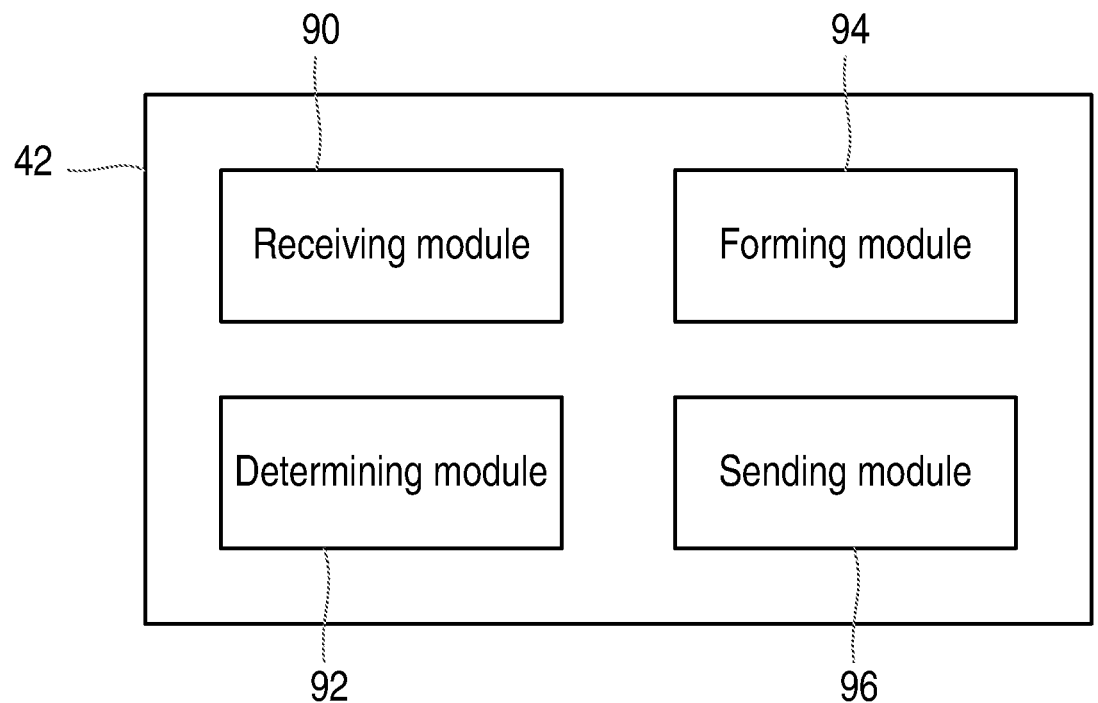
FIG. 12 is a block diagram of a terminal device according to another alternative embodiment.

FIG. 12 is a block diagram of another alternative terminal device 42 that can be used in the example embodiments described above. The terminal device 42 comprises a receiving module 90 configured to receive one or more signals; a determining module 92 configured to determine, for each of the one or more received signals, whether the signal was received from a network node 44 that is considered by the first network operator to be a priority node or from a network node 44 that is considered by the first network operator to be a non-priority node; a forming module 94 configured to form a measurement report comprising measurements of one or more of the received signals, the measurement report being formed by prioritizing the inclusion of measurements of signals received from priority nodes over measurements of signals received from non-priority nodes; and a sending module 96 configured to send the measurement report to a network node 40 in the first communication network 32.

Figure 13:
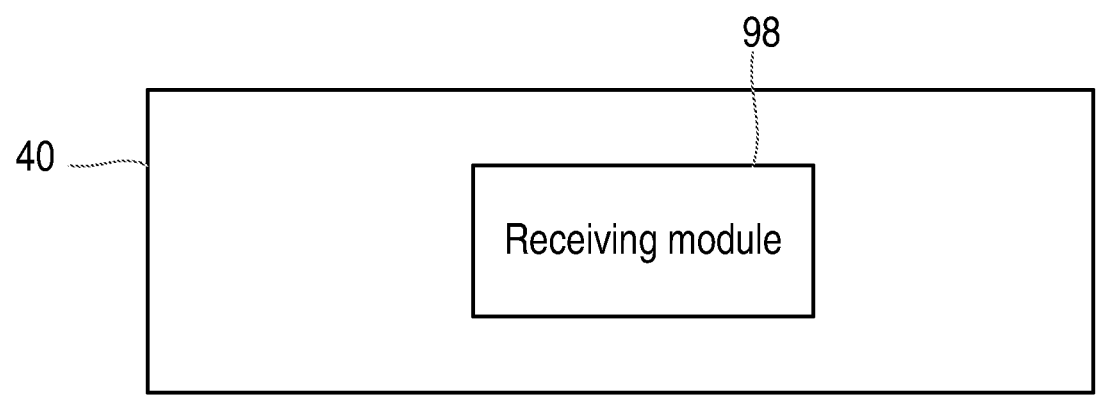
FIG. 13 is a block diagram of a network node according to another alternative embodiment.

FIG. 13 is a block diagram of another alternative network node 40 that can be used in the example embodiments described above. The network node 40 comprises a receiving module 98 configured to receive a measurement report from a terminal device 42 in the first communication network 32, the measurement report comprising measurements of one or more signals received by the terminal device 42, wherein the terminal device 42 formed the measurement report by prioritizing the inclusion of measurements of signals received from network nodes 44 considered by the first network operator to be priority nodes over measurements of signals received from network nodes 44 considered by the first network operator to be non-priority nodes. That is, the receiving module 98 is configured to receive a measurement report that comprises measurements of one or more signals received by the terminal device 42, and the measurements of signals received from network nodes 44 considered by the first network operator to be priority nodes are prioritized over measurements of signals received from network nodes 44 considered by the first network operator to be non-priority nodes.

Thus, the techniques described herein provide that when a UE sends a measurement report for WLAN measurements (or more generally measurements of signals received on a different RAT or measurements of signals received via unlicensed spectrum), the UE will include WLANs considered by the network operator to be priority WLANs. This will enable and/or improve the offloading to the operator's own or preferred WLANs in scenarios where the UE would, according to legacy measurement reporting mechanisms, only include non-operator WLANs in the measurement report.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method of operating a terminal device in a first communication network, wherein the first communication network is operated by a first network operator, the method comprising:
   receiving a list of network nodes that are considered by the first network operator to be priority nodes;
   receiving one or more signals;
   determining, for each of the one or more received signals, whether the signal was received from a network node that is considered by the first network operator to be a priority node or from a network node that is considered by the first network operator to be a non-priority node, wherein said determining comprises using the received list to determine whether each signal was received from a priority network node or from a non-priority network node;
   forming a measurement report comprising measurements of one or more of the received signals, the measurement report being formed by prioritizing the inclusion of measurements of signals received from priority nodes over measurements of signals received from non-priority nodes; and
   sending the measurement report to a network node in the first communication network.

2. The method as defined in claim 1, wherein the step of forming the measurement report comprises only including measurements of signals received from priority nodes.

3. The method as defined in claim 1, wherein the step of forming the measurement report comprises including an indication of the number of non-priority nodes that signals have been received from.

4. The method as defined in claim 1, wherein the step of forming the measurement report comprises including measurements of signals received from priority nodes, and only including one or more measurements of signals received from non-priority nodes if the number of measurements of signals received from priority nodes is less than a threshold value.

5. The method as defined in claim 4, wherein, in response to the number of measurements of signals received from priority nodes being less than the threshold value, the step of forming the measurement report comprises including one or more measurements of signals received from non-priority nodes that have the highest values for a quality metric.

6. The method as defined in claim 4, wherein, in response to the number of measurements of signals received from priority nodes being less than the threshold value, the step of forming the measurement report comprises including one or more measurements of signals received from non-priority nodes that operate on the same frequency, the same frequency band, the same channel and/or a neighboring channel as the priority nodes for which the measurements of the signals are included in the measurement report.

7. The method as defined in claim 1, wherein the step of forming the measurement report comprises applying an offset to measurements of signals received from priority nodes, and determining measurements of signals to include in the measurement report according to the offset measurements of signals from priority nodes and the measurements of the signals from non-priority nodes.

8. The method as defined in claim 1, wherein the measurements of signals are ordered in the measurement report according to a quality metric.

9. The method as defined in claim 1, wherein the measurements of signals are ordered in the measurement report according to whether the signals are received from priority nodes and non-priority nodes, and according to a quality metric.

10. The method as defined in claim 1, wherein the step of forming the measurement report comprises forming a first list that includes measurements of signals received from priority nodes and forming a second list that includes measurements of signals received from non-priority nodes.

11. The method as defined in claim 1, wherein the steps of forming the measurement report and sending a measurement report are only performed if a measurement of a signal received from at least one priority node meets predetermined criteria.

12. The method as defined in claim 1, wherein the list of network nodes comprises a list of identifiers of network nodes that are considered by the first network operator to be priority nodes.

13. The method as defined in claim 12, wherein the identifiers are wireless local area network (WLAN) identifiers such as a service set identifier (SSID), a basic SSID (BSSID), an extended SSID (ESSID), or a homogenous SSID (HESSID).

14. The method as defined in claim 1, wherein the step of determining comprises further determining that a signal originates from a network node that is considered by the first network operator to be a priority node if the priority node has the same network identifier as the first communication network.

15. The method as defined in claim 14, wherein the network identifier is a public land mobile network (PLMN) identifier.

16. The method as defined in claim 1, wherein the first communication network is operating according to a first radio access technology (RAT), and wherein one or more of the signals are received from network nodes operating according to a second RAT.

17. The method as defined in claim 16, wherein the second RAT is a wireless local area network (WLAN) RAT.

18. The method as defined in claim 1, wherein the first communication network is operating using licensed spectrum, and wherein one or more of the signals are received from network nodes using unlicensed spectrum.

19. A non-transitory computer-readable storage medium storing a computer program comprising program instructions that, when executed by a processor of a terminal device in a first communication network operated by a first network operator, cause the terminal device to:
receive a list of network nodes that are considered by the first network operator to be priority nodes;
receive one or more signals;
determine, for each of the one or more received signals, whether the signal was received from a network node that is considered by the first network operator to be a priority node or from a network node that is considered by the first network operator to be a non-priority node, wherein said determining comprises using the received list to determine whether each signal was received from a priority network node or from a non-priority network node;
form a measurement report comprising measurements of one or more of the received signals, the measurement report being formed by prioritizing the inclusion of measurements of signals received from priority nodes over measurements of signals received from non-priority nodes; and
send the measurement report to a network node in the first communication network.

20. A terminal device for use in a first communication network, wherein the first communication network is operated by a first network operator, the terminal device comprising:
transceiver circuitry configured for wireless transmission and reception; and
processing circuitry operatively associated with the transceiver circuitry and configured to:
receive a list of network nodes that are considered by the first network operator to be priority nodes;
receive one or more signals;
determine, for each of the one or more received signals, whether the signal was received from a network node that is considered by the first network operator to be a priority node or from a network node that is considered by the first network operator to be a non-priority node, wherein said determining comprises using the received list to determine whether each signal was received from a priority network node or from a non-priority network node;
form a measurement report comprising measurements of one or more of the received signals, the measurement report being formed by prioritizing the inclusion of measurements of signals received from priority nodes over measurements of signals received from non-priority nodes; and
send the measurement report to a network node in the first communication network.

21. The terminal device as defined in claim 20, wherein the processing circuitry is configured to form the measurement report by only including measurements of signals received from priority nodes.

22. The terminal device as defined in claim 20, wherein the processing circuitry is configured to form the measurement report by including an indication of the number of non-priority nodes that signals have been received from.

23. The terminal device as defined in claim 22, wherein the processing circuitry is configured to form the measurement report by including measurements of signals received from priority nodes, and only including one or more measurements of signals received from non-priority nodes if the number of measurements of signals received from priority nodes is less than a threshold value.

24. The terminal device as defined in claim 23, wherein the processing circuitry is configured to form the measurement report by including one or more measurements of signals received from non-priority nodes that have the highest values for a quality metric responsive to the number of measurements of signals received from priority nodes being less than the threshold value.

25. The terminal device as defined in claim 23, wherein the processing circuitry is configured to form the measurement report by including one or more measurements of signals received from non-priority nodes that operate on the same frequency, the same frequency band, the same channel and/or a neighboring channel as the priority nodes for which the measurements of the signals are included in the measurement report in the event that the number of measurements of signals received from priority nodes is less than the threshold value.

26. The terminal device as defined in claim 20, wherein the processing circuitry is configured to form the measurement report by applying an offset to measurements of signals received from priority nodes, and determining measurements of signals to include in the measurement report according to the offset measurements of signals from priority nodes and the measurements of the signals from non-priority nodes.

27. The terminal device as defined in claim 20, wherein the processing circuitry is configured to order the measurements of signals in the measurement report according to a quality metric.

28. The terminal device as defined in claim 20, wherein the processing circuitry is configured to order the measurements of signals in the measurement report according to whether the signals are received from priority nodes and non-priority nodes, and according to a quality metric.

29. The terminal device as defined in claim 20, wherein the processing circuitry is configured to form the measurement report by forming a first list that includes measurements of signals received from priority nodes and forming a second list that includes measurements of signals received from non-priority nodes.

30. The terminal device as defined in claim 20, wherein the processing circuitry is configured to form the measurement report and send a measurement report only if a measurement of a signal received from at least one priority node meets predetermined criteria.

31. The terminal device as defined in claim 20, wherein the list of network nodes comprises a list of identifiers of network nodes that are considered by the first network operator to be priority nodes.

32. The terminal device as defined in claim 31, wherein the identifiers are wireless local area network (WLAN) identifiers such as a service set identifier (SSID), a basic SSID (BSSID), an extended SSID (ESSID), or a homogenous SSID (HESSID).

33. The terminal device as defined in claim 20, further wherein the processing circuitry is configured to determine that a signal originates from a network node that is considered by the first network operator to be a priority node if the priority node has the same network identifier as the first communication network.

34. The terminal device as defined in claim 33, wherein the network identifier is a public land mobile network (PLMN) identifier.

35. The terminal device as defined in claim 20, wherein the first communication network is operating according to a first radio access technology (RAT), and wherein one or more of the signals are received from network nodes operating according to a second RAT.

36. The terminal device as defined in claim 35, wherein the second RAT is a wireless local area network (WLAN) RAT.

37. The terminal device as defined in claim 20, wherein the first communication network is operating using licensed spectrum, and wherein one or more of the signals are received from network nodes using unlicensed spectrum.

* * * * *